May 17, 1949. R. L. SMITH 2,470,323
COFFEE MAKER
Filed June 4, 1945
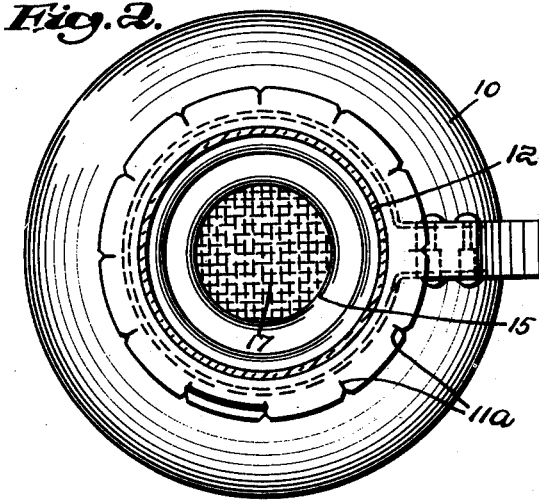
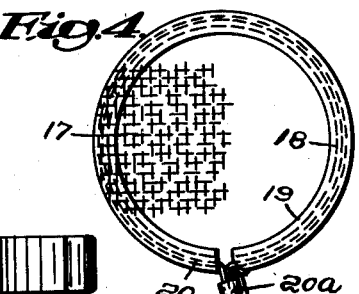
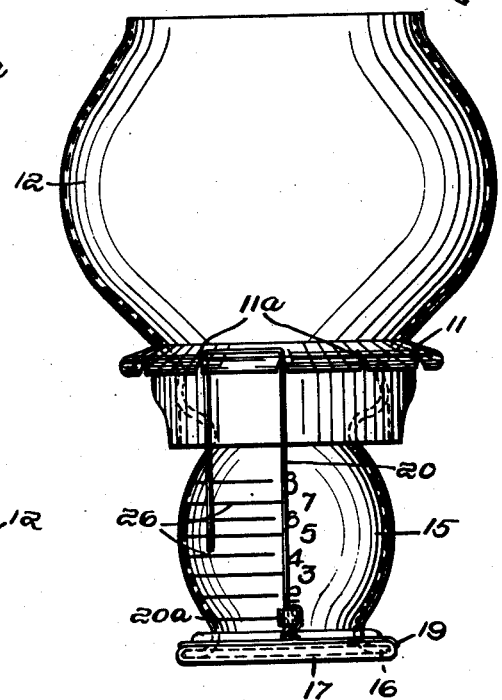
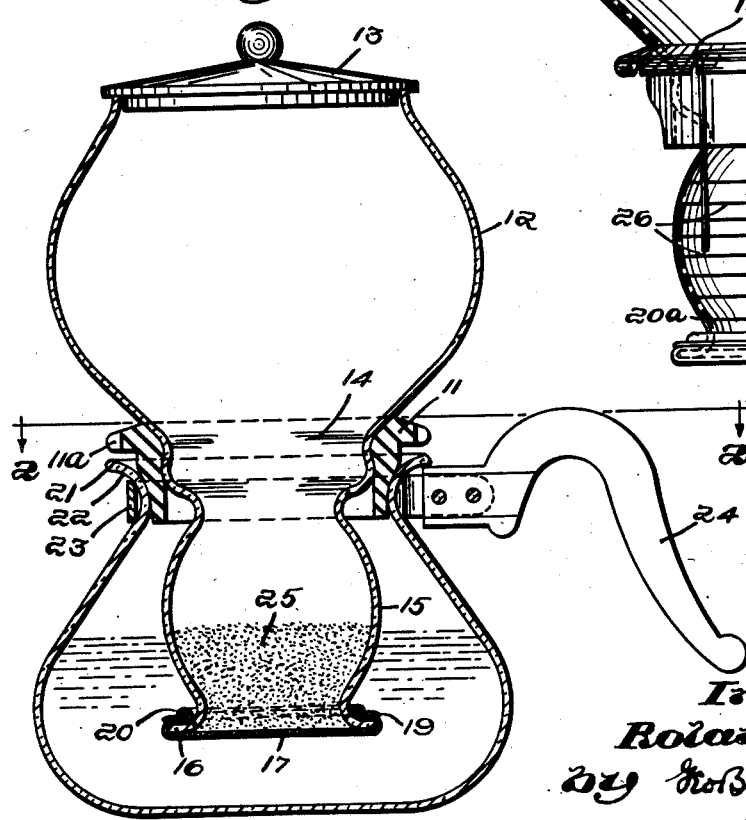
Inventor:
Roland L. Smith,
by Ros B Rawlings.
Attorney Patented May 17, 1949

2,470,323

UNITED STATES PATENT OFFICE 2,470,323

COFFEE MAKER

Roland L. Smith, Belmont, Mass., assignor to Nuproducts Corporation, Cambridge, Mass., a corporation of Massachusetts Application June 4, 1945, Serial No. 597,518

2 Claims. (Cl. 99—292)

This invention relates to coffee makers and preferably to a coffee maker of the so-called vacuum type in which the pressure of boiling water in a lower heating vessel automatically compels the water to flow therefrom into an upper infusion vessel for infusion with a predetermined charge of ground coffee contained therein, and vacuum automatically compels the infusion of liquid coffee to return to the lower vessel when the heating of the lower vessel is discontinued and the pressure therein drops below the point required to drive the water into the upper vessel.

In a common form of vacuum coffee maker on the market, the lower vessel has an open mouth into which is telescopically fitted an upper vessel equipped with a packing ring. The upper vessel is provided with a narrow tubular extension depending into the lower vessel and terminating a short distance above the bottom thereof. The upper end of the tubular extension is covered by a strainer disc of cloth which, due to its lack of mechanical strength, has to be held in shape by tying it at its edge around a perforated porcelain disc seating over the upper end of the tube. The entire strainer unit is itself held in place by means of a coiled spring anchored at its upper end to the porcelain disc and extending downwardly into the tube and provided at its lower end with a hook and a short chain to be grasped by the fingers for the purpose of stretching the spring far enough to permit the hook to be anchored under the lower edge of the tube.

In an alternative form of strainer, the cloth disc is held in place by a coiled or plain wire expansion ring.

Both types of strainer are open to the objection that either a poor fit against the glass is formed or numerous folds are formed in the cloth permitting portions of the more finely divided coffee grounds and sediment to by-pass the strainer and descend into the lower vessel instead of being caught by the mesh of the cloth.

Both types are also open to the objection that the cloth is difficult to remove and clean, due to the tendency of the drawstring to catch in the coils of the spring. Moreover, the porcelain disc collects coffee residue in its perforations and on the unglazed surfaces of the disc.

In other forms of coffee maker, the filter cloth is omitted and a glass rod provided with an enlarged portion is inserted in the tube and seated either by gravity or by a coil spring hooked under the lower edge of the tube. The enlarged portion is covered with a roughened surface on which a filtering layer of coffee grounds eventually builds up. However, considerable portions of the coffee grounds pass through or around the enlarged portion before the device finally clogs sufficiently to act as an effective screen, and in any case, neither of these constructions seems to filter the coffee as efficiently as a cloth filter.

In all forms where a coiled spring is used, the inner surfaces of the spring soon become fouled with old coffee residue which is not only difficult to get at in order to remove, but if not removed may affect the taste of the coffee.

Moreover, the metallic parts used to hold the strainer in place are apt to react with the chemical constituents of the coffee to produce salts which impart an unnatural taste or flavor to the coffee.

My invention retains the cloth type of filter in an improved form while obviating the aforementioned and other objectionable features of the prior art. My filter is not only more efficient to use, but less expensive to manufacture, doing away entirely with both the porcelain disc and the metal spring and its extension.

In my construction a coffee reservoir with a removable porous bottom is provided. This reservoir is provided with means for measuring the ground coffee as it is poured directly into it from its original container.

The advantages are many:

1. There is no longer any danger of the coffee grounds by-passing the filter and settling into the lower vessel, nor chance of trouble, due to folds in the cloth, and moreover practically the entire surface of the cloth filter is utilized instead of merely a small number of perforations, as in the case of the porcelain disc or glass rod, thereby enabling a much finer grind of coffee to be used.

2. The cloth strainer may be attached or detached in a few seconds, since only a single drawstring protrudes from the edge of the cloth strainer and there is no need to tie the drawstring nor to provide the cloth strainer with an elastic retaining element, as has sometimes been done.

3. The coffee ground reservoir is located within the lower vessel but is integral with the upper vessel. The open top of the upper vessel serves as a funnel to guide the coffee, without the usual danger of spilling it around. Moreover, my coffee reservoir is a self-contained measuring means, thereby avoiding the necessity for using a separate measuring device or spoon for measuring out a starting quantity of ground coffee. Preferably the coffee chamber is provided with suitable indicia by means of which the proper charge of ground coffee may be measured. These indicia may refer to the number of cups of liquid coffee to be made or they may refer to the number of tablespoonfuls of ground coffee to be placed in the coffee reservoir.

4. The upper vessel, upon being removed from the lower container after use, will stand upright upon its flanged base, so there is no longer any need to take great care against having it roll off onto the floor or any need to provide, as some manufacturers do, a special stand for holding it upright.

5. All interior parts of my coffee maker which are exposed to the reaction of the coffee, except the cloth strainer, are non-metallic, being preferably made of glass or other ceramic or refractory material which is inert to the coffee, and hence will not impart an unnatural taste or flavor thereto.

6. My coffee maker comprises a minimum number of working parts and these may be quickly and easily assembled and disassembled for purposes of cleaning or sterilizing the surfaces thereof which come into contact with the coffee.

Other advantages will appear as this description proceeds.

In carrying out my invention, I prefer to construct my coffee maker as follows:

The lower water-heating vessel is made with the usual opening at its top into which is telescopically fitted an upper infusion vessel equipped with a packing ring of resilient material, such as rubber or the like. The upper coffee infusion vessel is provided with a coffee reservoir having a removable porous bottom. The lower end of the coffee reservoir is disposed near the bottom of the interior of the water-heating vessel and is flanged to have removably secured thereto a removable strainer element of foraminous sheet material. The strainer closes the bottom of the coffee reservoir, and also serves to prevent the passage of coffee grounds and sediment into the lower vessel at the conclusion of the infusion period.

In order to reliably hold the strainer in operative position while yet enabling it to be readily removed when required, I fasten one end of its drawstring to a bead or equivalent fastening device and extend the other end of said string for a distance sufficient to permit it to be carried up to the sealing ring and anchored thereto.

Other features of my invention are hereinafter pointed out.

In the accompanying drawing wherein I have illustrated a preferred embodiment of my invention:

Figure 1 is a vertical section through my improved coffee maker, the sealing ring being shown slightly raised for clarity of illustration.

Figure 2 is a section on line 2—2 of Fig. 1.

Figure 3 is a side elevation of the infusion vessel and associated parts, removed from the assembly, and Figure 4 is a plan view of a strainer suitable for use as part of my improved coffee maker.

The illustrated embodiment of my invention comprises a lower water-heating vessel 10 of glass or other ceramic or refractory material. Vessel 10 has an opening at its top into which is telescopically fitted an upper infusion vessel 12 equipped with a packing ring 11 of rubber or other suitable resilient material. Vessel 12 is also of glass or other ceramic or refractory material and has at its top an opening that is normally closed by a removable lid or cover 13.

The bottom of vessel 12 is shaped to provide a central opening 14 and a depending coffee reservoir extension 15. The lower end of extension 15 is disposed near the bottom of the interior of water-heating vessel 10 and is provided with an external annular radial flange 16 which serves as a means for holding in position a strainer disc 17 made from foraminous sheet material such as cloth, for example.

Strainer 17 has its marginal portion folded inwardly and secured in that position by a line of stitches 18 so as to provide a tubular hem 19 inclosing a drawstring 20. The strainer is applied to the lower end of the coffee reservoir 15 with its hem above the flange 16 so that said hem is contracted and drawn into position above said flange by the drawstring, thereby fastening the strainer securely in position across the open end of the coffee reservoir.

One end of the drawstring is fastened to a bead or its equivalent 20ª and the other end of the string is passed through the bead and made long enough to be anchored in adjacent slits 11ª cut in the marginal edge of the ring 11 at a plurality of spaced points. I may however fasten the ends of the drawstring in other manners.

The chime at the top of vessel 10 is flared outwardly as at 21 to provide an annular channel or recess 22 upon the exterior of the vessel adjacent to the top thereof for the reception of an encircling band 23 whose opposite ends are bolted to the opposite sides of a handle 24.

In using the above-described coffee maker a measured amount of water is poured into vessel 10 and a measured amount of ground coffee is placed within the coffee reservoir as indicated at 25 where it is supported by the strainer 17. Then the vessel 12 with packing ring 11 mounted thereon is telescopically fitted into the vessel 10 so as to occupy the position shown in Fig. 1. Heat is now applied to vessel 10 and steam is generated therein. This forces the water upwardly through coffee reservoir 15 and into vessel 12 carrying the ground coffee with it. When the heating of vessel 10 is discontinued and said vessel is permitted to cool the steam within the same is condensed and atmospheric pressure forces the infusion downwardly from vessel 12 through strainer 17 and into vessel 10, the infusion carrying the coffee grounds with it back into coffee reservoir 15 where it is deposited upon strainer 17. The vacuum produced within vessel 10 causes the downward discharge of all of the infusion from extension 15 into vessel 10. The strainer effectually preventing the passage of sediment or coffee grounds into vessel 10 during the downward movement of the infusion.

If desired, the exterior of the coffee reservoir 15 may be provided with a series of graduations 26 for use in measuring the ground coffee as it is poured therein from its original container.

The coffee reservoir 15 has been shown as of somewhat globular shape, but may be straight or tapered if desired, or otherwise shaped.

While I have shown and described a preferred embodiment of my invention and have suggested certain possible modifications, I recognize that still other changes in construction, design, and material may be made as occasion demands. All such are therefore to be regarded as within the purview of my invention if within the scope of the appended claims.

Although I have illustrated a vacuum type coffee maker, it will be understood that the principles of my invention are applicable to other types.

I claim:

1. An infusion vessel for use with the lower water-heating vessel of a coffee maker, comprising a container having a tubular reservoir for holding ground coffee and a larger reservoir thereabove, a ring on and extending exteriorly about the infusion vessel between the two reservoirs for supporting the infusion vessel on and with its tubular reservoir depending into the lower vessel, a flexible filter over the bottom end of the infusion vessel, a draw string for maintaining the filter in place on the vessel, and means carried by the ring for receiving and anchoring the draw string.

2. The combination defined in claim 1 in which one end of the draw string passes through an eye carried by the other end of the draw string, pulling on said one end of the draw string being adapted to constrict the filter onto the vessel, and said means carried by the ring being adapted to receive and anchor said one end of the draw string.

ROLAND L. SMITH.

REFERENCES CITED

The following references are of record in the file of this patent:

UNITED STATES PATENTS

| Number | Name | Date |
| --- | --- | --- |
| 129,882 | Behringer | July 31, 1872 |
| 782,956 | Ferguson | Feb. 21, 1905 |
| 1,983,142 | Moriya | Dec. 4, 1934 |
| 2,224,378 | Coniglio | Dec. 10, 1940 |
| 2,386,532 | Wolcott | Oct. 9, 1945 |

FOREIGN PATENTS

| Number | Country | Date |
| --- | --- | --- |
| 10,485 | Great Britain | 1888 |